United States Patent
Tuomikoski (10) Patent No.: US 6,241,080 B1
(45) Date of Patent: Jun. 5, 2001

(54) METHOD FOR CHAIN DRIVE AND CHAIN

(75) Inventor: Pekka Tuomikoski, Kaaro (FI)

(73) Assignee: Finnketju Invest Oy, Rauma (FI)

( * ) Notice: Subject to any disclaimer, the term of this patent is extended or adjusted under 35 U.S.C. 154(b) by 0 days.

(21) Appl. No.: 09/171,678

(22) PCT Filed: Apr. 25, 1997

(86) PCT No.: PCT/FI97/00247

§ 371 Date: Oct. 23, 1998

§ 102(e) Date: Oct. 23, 1998

(87) PCT Pub. No.: WO97/42430

PCT Pub. Date: Nov. 13, 1997

(30) Foreign Application Priority Data

May 3, 1996 (FI) ............................................. 961874

(51) Int. Cl.⁷ ........................... B65G 23/06; B65G 17/06; F16G 13/02
(52) U.S. Cl. ........................... 198/834; 198/853; 474/219
(58) Field of Search ............................ 198/834, 853; 474/219, 228

(56) References Cited

U.S. PATENT DOCUMENTS 302,812 * 7/1884 Anderson ........................... 474/219
1,893,467 * 1/1933 Merwin ............................ 474/219

FOREIGN PATENT DOCUMENTS

| 97792 | 9/1897 | (DE) . |
| 64707 | 8/1983 | (FI) . |
| 91798 | 4/1994 | (FI) . |
| 1 309 685 | 3/1973 | (GB) . |

* cited by examiner

Primary Examiner—Robert P. Olszewski
Assistant Examiner—Bryan Jaketic
(74) Attorney, Agent, or Firm—Connolly Bove Lodge & Hutz, LLP (57) ABSTRACT

Method for chain drive, whereby the chain, such as a transmission chain, conveyor chain and/or like, is formed of several shaped pieces (1), that are connected to each other one after another at jointing points (N) by means of joint pins, and that is being driven by means of a wheel arrangement, that includes at least one chain wheel (7), such as a drive wheel, a turning wheel or the like. Particularly wearing of the chain, that is due to bending of the chain essentially along the longitudinal direction (p) of the joint pins, is being minimized by taking advantage of joint pins (x), the cross section of which changes in the longitudinal direction (p). The invention also relates to chain functioning according to the method.

8 Claims, 6 Drawing Sheets

METHOD FOR CHAIN DRIVE AND CHAIN

The invention relates to a method for chain drive, whereby the chain, such as a transmission chain, conveyor chain and/or like, is formed of several shaped pieces, that are connected to each other one after another at jointing points by means of joint pins. The chain is being driven by means of a wheel arrangement, that includes at least one chain wheel, such as a drive wheel, a turning wheel or a like.

The method according to the invention may be exploited even with a so called traditional chain structure, in which the power transmission of the chain structure is being transmitted by a drive wheel, the tooth shape of which is usually standardized. The meaning of the invention is of importance in more developed chain structures, also, in which e.g. the supporting surface of the chain comprises notches, that are crosswise in respect to the moving direction of the chain and that are during conveying of the chain in cooperation with counterpart surfaces, such as drive pins or like belonging to the chain wheel, that are arranged according to the notches and essentially crosswise in respect to the moving direction.

The type of developed chain structure described above is previously known e.g. from Finnish Patents FI 64707 or FI 91798. The shaped piece being represented in these comprises a notch existing crosswise in respect to the moving direction of the chain, the length of which corresponds to the width of the shaped piece, and which is advantageously placed near the other link point of the shaped piece. In this case when the chain bends on the drive wheel an advantageous lever arm is achieved, thanks to which the chain force influencing the chain structure presses the notches of the chain harder against the pins of the drive wheel. This solution decreases significantly a so called skipping of the chain. In addition to that due to the lever arms being achieved the chain structure disengages easily from the chain wheel on the releasing side, whereby a so called non-disengagement of the same is prevented.

The chain structure according to Patent FI 64707 has proved to be significantly better than corresponding earlier solutions, particularly thanks to the lever arms being achieved. In certain purposes, such as in chain structures being used in water refineries, plastics or corresponding non-metallic materials have been exploited because of corrosion and to decrease the specific gravity of the chain. In this case in certain applications there has been found problems, that are caused by bending forces directed to the chain in the level corresponding the joint pins e.g. because of natural bending of the chain when the chain is being used in such position, that the joint pins are in a vertical position. Due to this during cooperation between ordinary straight joint pins and corresponding straight counterpart surfaces existing in the shaped piece even a small angular alteration causes always that, that the counterpart surfaces of successive shaped pieces are in contact with each other only by the other edge of the same. This naturally causes wearing of both the joint pins and counterpart surfaces, because the surface pressures are very high e.g. when the chain starts to move in such a bended situation as described above.

The above is valid with the solution according to Patent FI 91798, also. The purpose of this solution is mainly to improve functioning of the chain particularly with a view to skipping and non-disengagement of the same, in which respect with the solution in question there has been achieved remarkable improvement when compared to traditional solutions particularly in certain types of purposes. In the solution according to FI 91798 the free longitudinal internal measure of the notches of the chain is arranged to change, in which case, when the notches formed by the shaped pieces of the chain are in cooperation with the counterpart surfaces of the drive wheel, the free longitudinal internal measure of each notch may be altered to correspond the contact length of the corresponding counterpart surface, that is the diameter of the drive pin. With this solution the typical problems involved with solutions known previously, such as skipping and non-disengagement of the chain may be avoided. In addition to that a chain of this type may be used with as high loads to both moving directions, that has not been possible earlier with corresponding solutions.

Thus, when manufacturing chains nowadays for most heterogeneous purposes particularly of non-metallic materials, the bending stress directed as described above has been found to be a very big problem in practical. Because of this the chain starts to behave undesirably, sometimes even after a very short use, correcting of which requires changing the chain. In practice this always causes disproportionately long interruptions of use and organizing problems both in storing and maintenance. In certain uses the bend stress as described above may be so powerful, that continuous observing as well as maintenance measures are required with very short intervals e.g. to tighten the chain for removing of the clearances caused by wearing.

It is the aim of the method for according to this invention to achieve a decisive improvement in the problems presented above and thus to raise substantially the level of knowledge in the field. To achieve this aim, the method according to the invention is primarily characterized in, that, particularly wearing of the chain, that is due to bending of the chain essentially along the longitudinal direction of the joint pins, is being minimized by taking advantage of joint pins, the cross section of which changes in the longitudinal direction.

As the most important advantages of the method according to the invention may be mentioned the simplicity of the same as well as the simplicity of the practical structures of the same as well as of the mounting measures relating to the same. As described above, when exploiting advantageously e.g. joint pins, that are continuously conical, the surface pressures may be optimized under all circumstances in a way, that the type of bending of the chain may be even totally eliminated in principle. In addition to that by exploiting the type of joint pins even mounting of the chain may be eased by the guiding influence of the conical joint pin.

Advantageous embodiments of the method according to the invention are presented in the dependent claims directed to the method.

The invention relates to a chain functioning according to the method, also, that is represented in greater detail in the preamble of the independent claim related to the same. The primary characteristics of the chain are represented in the characterizing part of the corresponding claim.

As the most important advantages of the chain according to the invention may be mentioned simplicity and reliability of the same, whereby with the same it is possible to increase significantly the operating time of the chain. This is thanks to that, that the surface pressures being caused by bending of the chain along the longitudinal direction of the joint pin may be minimized in a surprising and extremely advantageous way differing from the traditional solutions, by exploiting e.g. continuously conical joint pins. In this case during the bending situation of the above type of the chain the joint pin and the corresponding counter part surface in the shaped piece tend to settle within each jointing point to a most advantageous position in respect to the mutual surface pressures. This is why high point surface pressures are avoided that are always caused to joint pins and corners of the counterpart surfaces of the shaped pieces of conventional right-angled solutions. One crucial advantage of the chain according to the invention is furthermore that, that the chain may be mounted easily by influence of the guiding effect of the e.g. conical joint pins.

Advantageous embodiments of the chain according to the invention are represented in the dependent claims related to the chain.

In the following description, the invention is illustrated in detail with reference to the appended drawings. In the drawings.

Figures 6A, 6B:
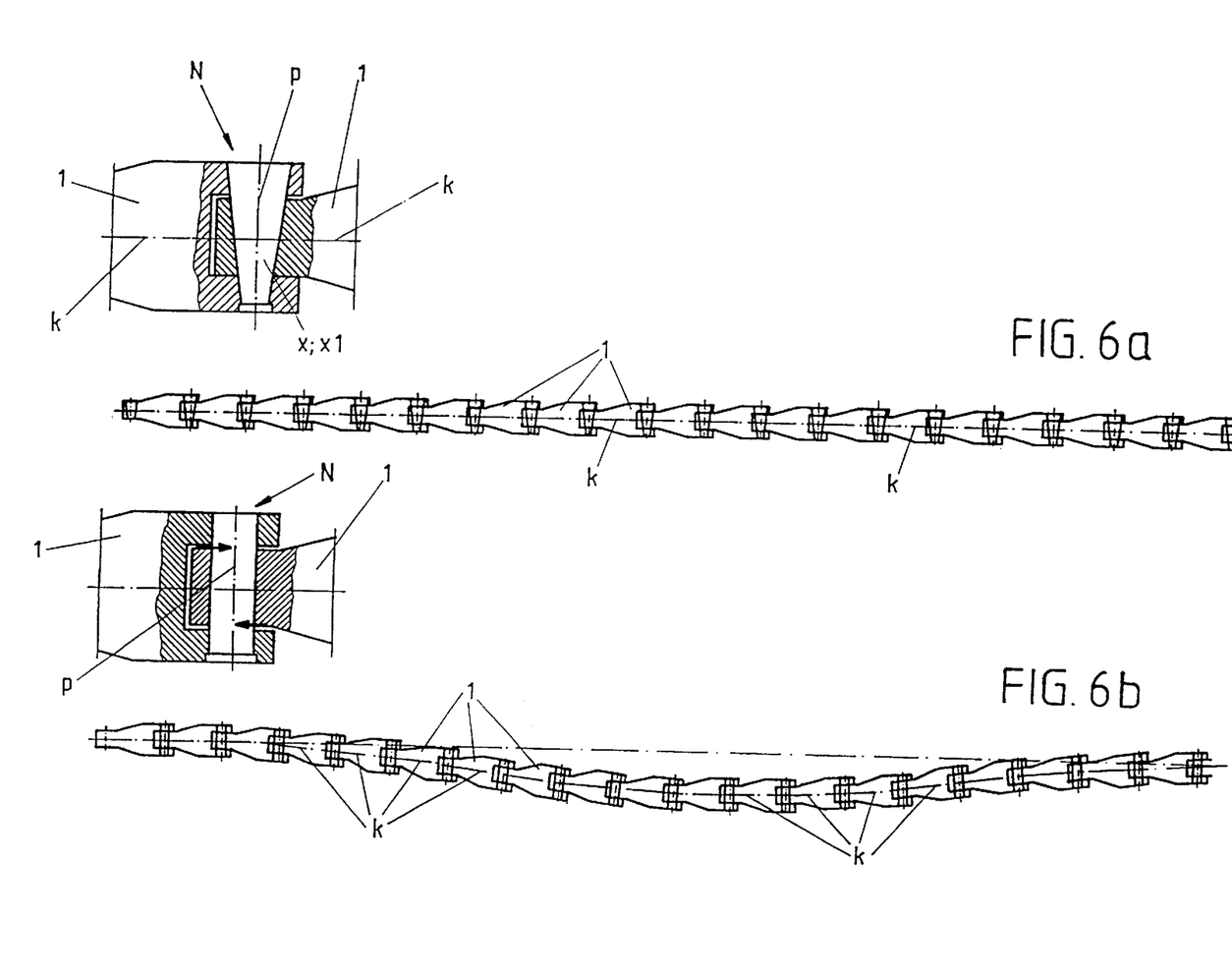
FIG. 6a shows bending of the chain according to the invention and FIG. 6b shows bending of a conventional chain.

The invention relates to a method for chain drive, whereby the chain, such as a transmission chain, conveyor chain and/or like, is formed of several shaped pieces 1, that are connected to each other one after another at jointing points N by means of joint pins. The chain is being driven by means of a wheel arrangement, that includes at least one chain wheel 7, such as a drive wheel, a turning wheel or a like. Particularly wearing of the chain, that is due to bending of the chain essentially along the longitudinal direction p of the joint pins, is being minimized by taking advantage of joint pins x, the cross section of which changes in the longitudinal direction p, but instead a situation represented in FIG. 6a is achieved, whereby due to eliminating/decreasing of bending the stresses and surface pressures being directed both to the joint pins as well as to the counter part surfaces being in contact with the above, have been efficiently minimized. In this case an extensive bending as shown in FIG. 6b, that is typical for a conventional chain, is avoided.

As an advantageous embodiment of the method a chain is being exploited therewith, the supporting surface 1b of which comprises notches 2, that are arranged preferably essentially crosswise in respect to the moving direction s of the chain, and that are during conveying of the chain in cooperation with the counterpart surfaces 9, such as drive pins 9a or like belonging to the chain wheel 7, that are arranged according to the notches 2 and essentially crosswise in respect to the moving direction s. In this case each shaped piece 1 has two link points 4, 5, the first link point of which is arranged as a uniform projection 4, that is essentially narrower than the width 1 of the shaped piece, and the other one as a fork 5. Within both link points 4, 5, there exists holes 6, in which case to form a chain each jointing point N is formed by placing the said projector 4 of a previous shaped piece between the fork 5 of a following shaped piece and by placing a joint pin or like in the hole 6. As an advantageous embodiment of the method the contact area at the jointing points N, that is due to the mutual angular alteration of the center lines k of the successive shaped pieces 1 of the chain, is being expanded by exploiting a joint pin (x; x1, x2, x3), the cross section of which is at least partly continuously extending towards the other end of the same, such as conical in a linear, convex or concave way.

Figure 1:
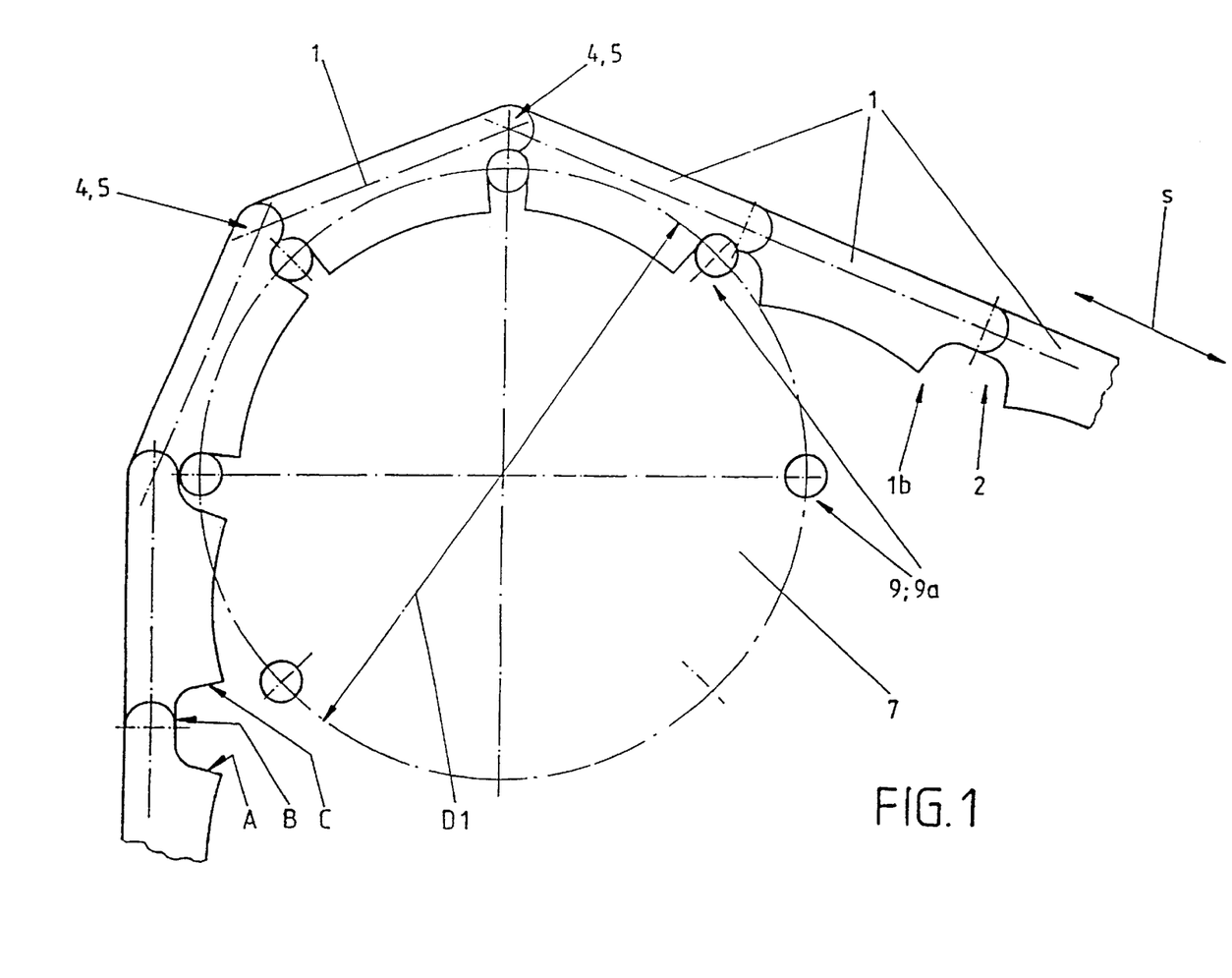
FIG. 1 represents as a side view a principle of an advantageous chain wheel arrangement.

With reference to FIG. 1 the chain according to the invention comprises thus several shaped pieces 1 connected to each other by the jointing points and a wheel arrangement, which comprises at least one drive wheel 7 to convey the chain formed of the said shaped pieces 1. The supporting surface 1b of the chain comprises a notch 2 nereby the jointing point of each shaped piece 1, that is arranged crosswise in respect to the moving direction s and eccentrical in respect to the joint spacing, that is formed of a contact edge A, a bottom B and a trailing edge C. The notches 2 of the chain are during conveying of the chain in cooperation with the counterpart surfaces 9, that is drive pins 9a, belonging to the drive wheel 7, that are arranged to the notches 2 and crosswise in respect to the moving direction of the chain. The length of the pins 9a corresponds advantageously the width L of the shaped pieces.

During the cooperation of the pins 9a and the notches 2, that starts from the end having the contact edge A of the latter, wherein the chain is at least starting to bend over the drive wheel, the width of the contact area, that is formed, corresponds advantageously the width 1 of the shaped piece. After the said cooperation, when the chain straightens, the counterpart surface 9 leaves the notch 2 of the chain from the end having the trailing edge C. The free longitudinal internal measure of each notch 2 of a chain, that is at least in a straight position, is essentially bigger than the contact length of the counterpart surface 9, which means in the presented embodiment the diameter of the drive pin 9a.

The free longitudinal internal measure of the notches 2 of the chain are thus arranged to change according to patent FI 91798, whereby, when the notches 2 of the chain formed of the shaped pieces 1 is in cooperation with the counterpart surfaces 9 of the drive wheel 7, the free longitudinal internal measure of each notch 2 has been arranged to change to correspond the diameter of the drive pins 9a. Naturally the method according to the invention may be applied in connection with more conventionally functioning chains, also.

The chain being represented above has thus been improved particularly in that respect, that cross section of the joint pins x belonging to the same is arranged to change in the longitudinal direction p particularly to minimize wearing of the chain, that is due to bending of the chain essentially along the longitudinal direction p of the joint pins. In this way an extensive bending as shown in FIG. 6b, that is typical for a conventional chain is avoided, but instead a situation according to FIG. 6a is achieved, whereby stresses and surface pressures being directed to both the joint pins as well as the counterpart surface being in contact with the same are very efficiently minimized due to eliminating/decreasing of the bending.

Figure 3:
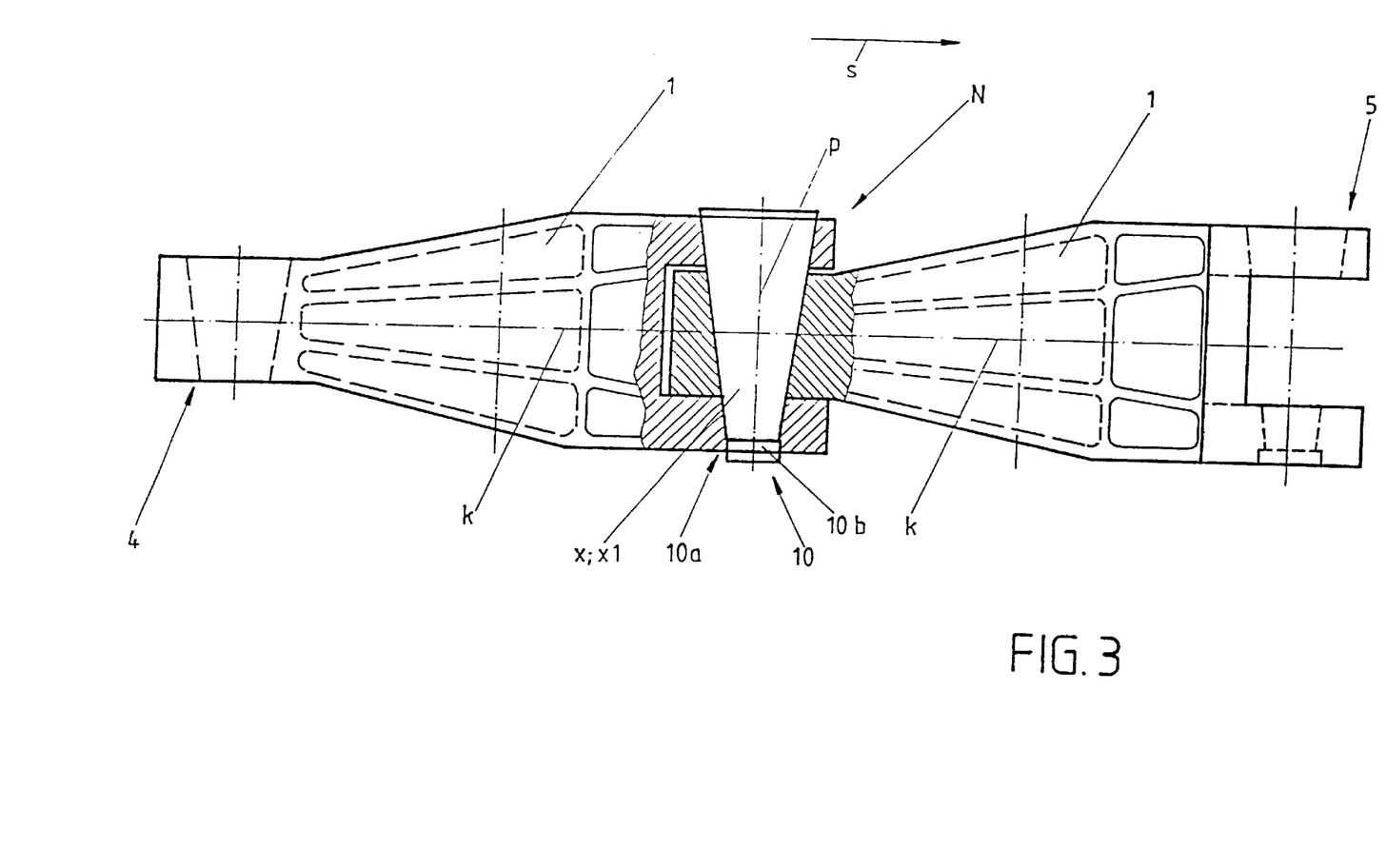
FIG. 3 represents a side view of an advantageous chain according to the invention when a joint pin is being used, that is conical in a linear way.
Figure 4:
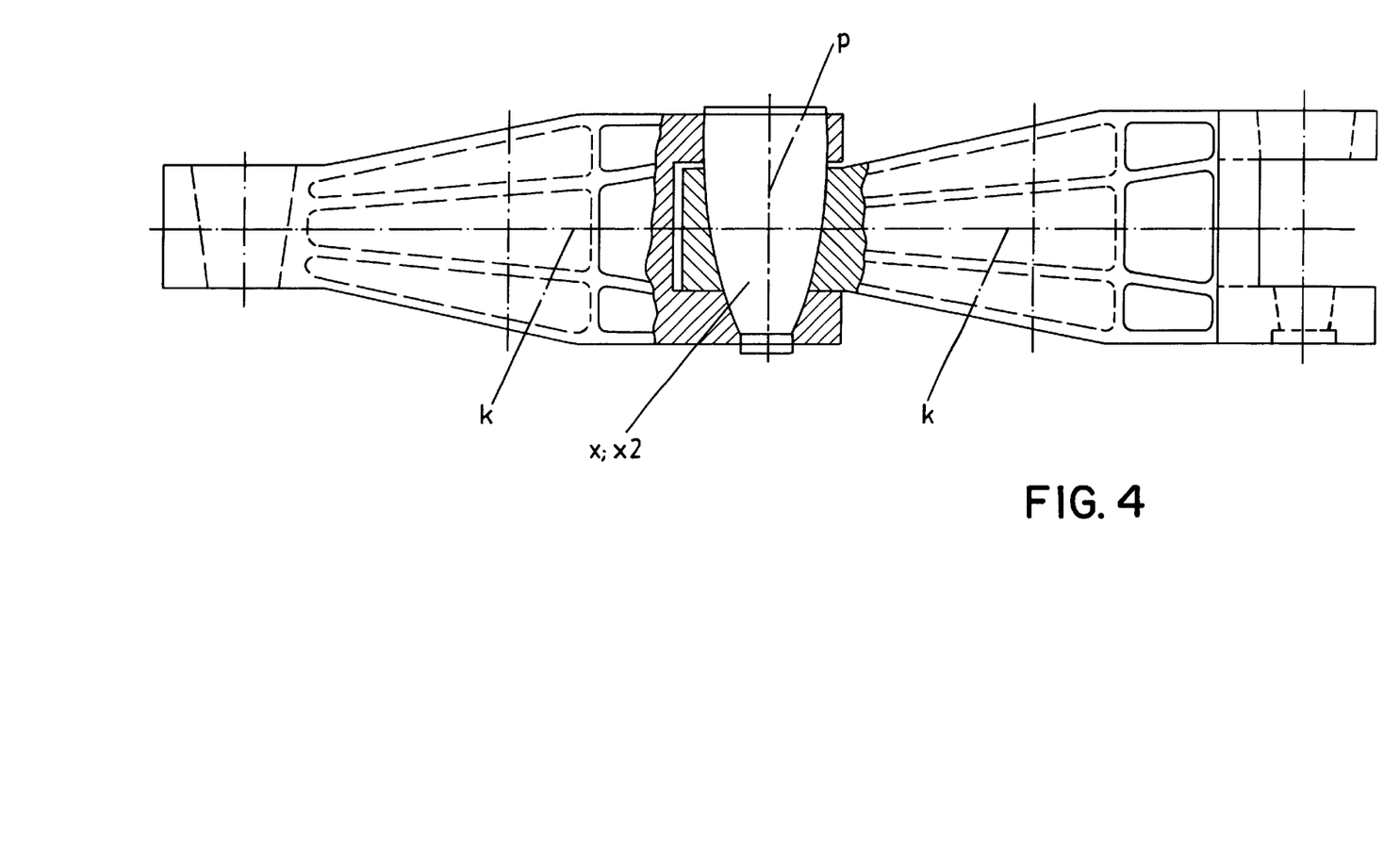
FIG. 4 shows an alternative solution in respect to FIG. 3.
Figure 5:
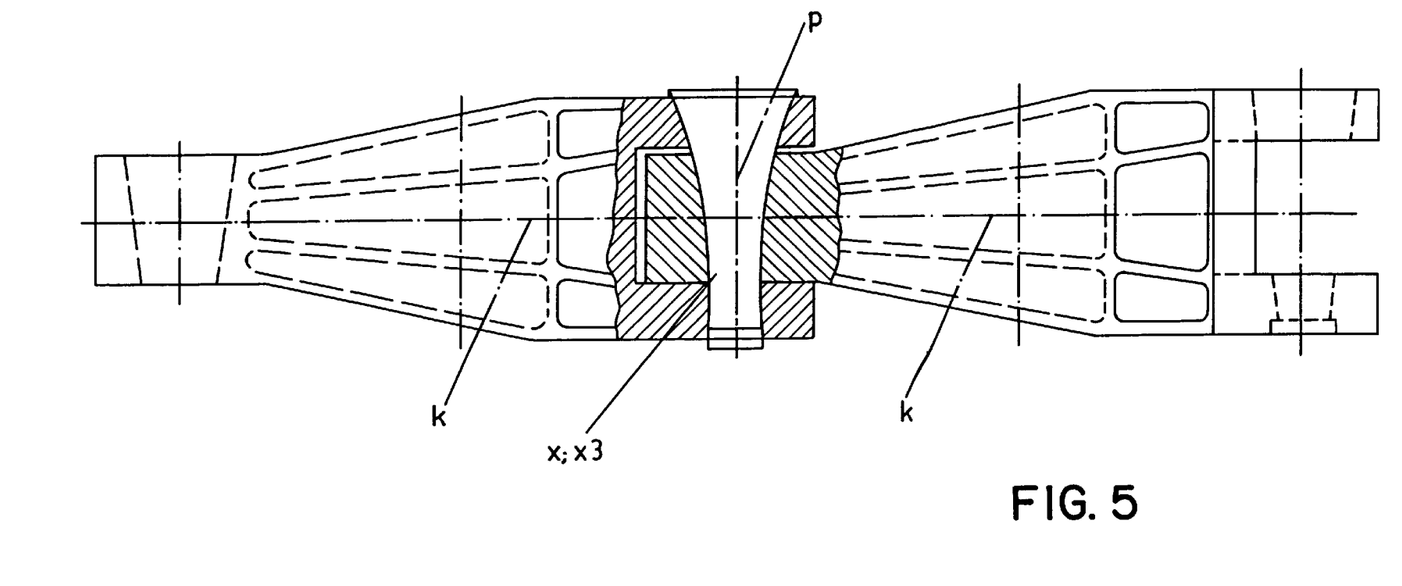
FIG. 5 shows furthermore one alternative solution in respect to FIGS. 3 and 4 above.

As an advantageous embodiment the joint pins x of the chain are arranged to extend continuously towards the other end, to expand the contact area at the jointing point N, that is due to the mutual angular alteration of the center lines k of the successive shaped pieces 1. In the solutions being represented particularly in FIGS. 3–5 the cross section of the joint pins x is arranged to change conically towards the other end of the same. In the solution according to FIG. 3 there has been exploited in a linear way conical joint pins x1, in FIG. 4 in a convex way conical joint pins x2 and in FIG. 5 correspondingly in a concave way conical joint pins x3. In addition to that the cross sections of the joint pins x, being preferably of the same shape and being placed at link points 4, 5 at opposite ends of the chain, are arranged to change to the same direction.

Figure 2A:
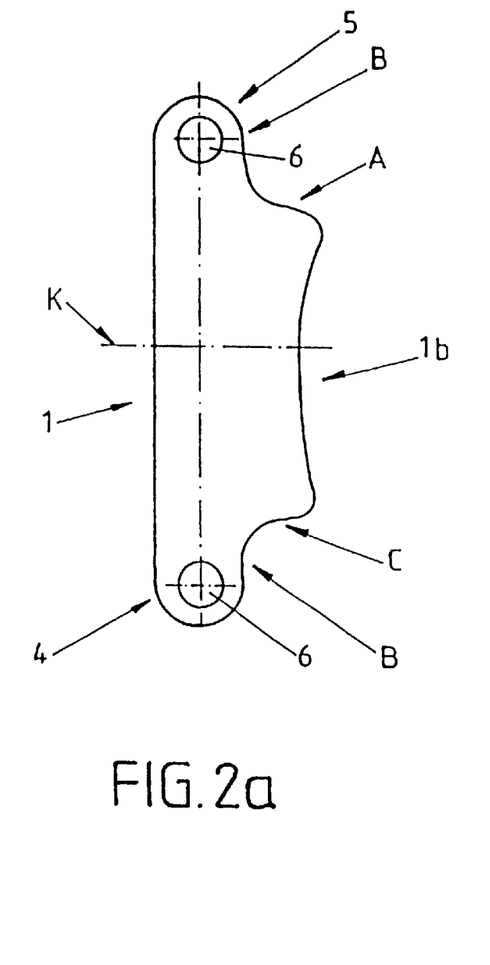
FIGS. 2a and 2b represent a side view and a front view of an advantageous shaped piece being used in a chain adapting the method according to the invention.
Figure 2B:
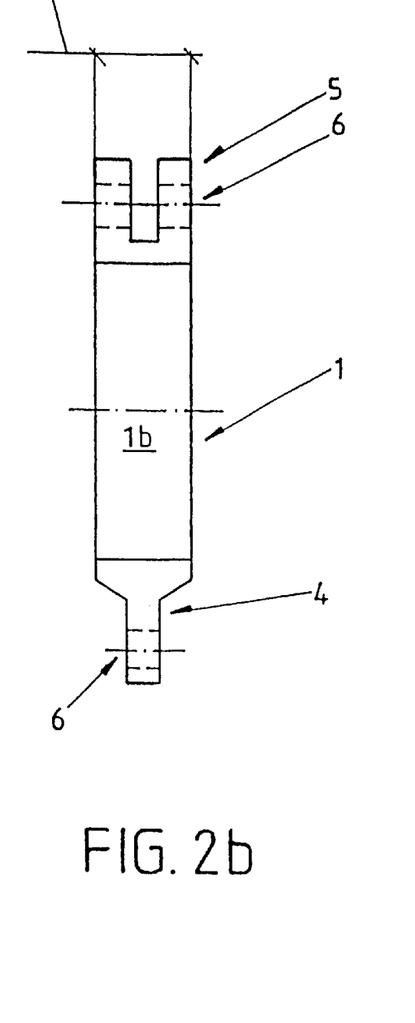

Furthermore with reference particularly to FIG. 2, in connection with the narrower end of the jointing point N of the chain there has been arranged locking means 10, that are represented in the principal drawings by the locking grooves 10a in each shaped piece 1 and a cotter ring arrangements 10b in connection with the joint pin x. The joint pins may naturally be mounted in place by riveting as usual.

It is obvious, that the invention is not limited to the embodiments presented or described above, but it can be modified within the basic idea even to a great extent. In this connection it may thus be possible to exploit at the jointing points of the successive shaped pieces joint pins, that extend to opposite directions. It is also naturally possible to prepare the joint pins being made of suitable materials in a way, that in the joint pins there are projection arrangements ready, that enable some kind of snap locking.

What is claimed is:

1. Method for manufacturing a chain drive, comprising:
   forming shaped pieces (1) having two ends, whereby each end is formed to interlock with an opposite end of another shaped piece (1);
   connecting several shaped pieces (1) to each other, one after another, at jointing points (N);
   forming joint pins (x) that are uniform about an axis in the longitudinal direction (p) of the joint pins (x) and have a cross section that extends continuously conically in one direction towards an end of the joint pin;
   fastening the several shaped pieces (1) to each other at the jointing points (N) to form a chain by inserting a joint pin (x) through corresponding holes formed in opposite ends of the shaped pieces (1), for each interconnection of shaped pieces;
   securing the joint pins (x) within the holes of the shaped pieces with a locking means (10); and
   attaching the chain to at least one chain wheel (7), whereby:
   the conical cross section of the joint pins (x) minimizes bending of the chain along the longitudinal direction (p) of the joint pins (x), when the chain is rotationally driven by the chain wheel (7), to reduce operational wear to the chain.

2. Method according to claim 1, further comprising Forming, as joint points (N) on opposite ends of each shaped piece (1), a uniform projection (4), which is narrower than the width (1) of each shaped piece (1), and a corresponding forked projection (5), for receiving the uniform projection (4) of another shaped piece (1);
   forming notches (2) in the shaped pieces that are essentially crosswise with respect to the moving direction (s) of the chain;
   arranging the chain on the chain wheel (7) so that the notches (2) cooperate with counterpart and corresponding surfaces (9) of the chain wheel (7) to drive the chain when the chain wheel (7) is rotated; and
   inserting a joint pin (x) through each set of corresponding holes formed in opposite ends of the shaped pieces (1), using a joint pin having a conical shape formed in a linear, convex, or concave way, to expand the contact area at the jointing point (N) that results from the mutual angular alteration of the center lines (k) of the successive shaped pieces.

3. A chain comprising:
   a number of conically shaped joint pins (x);
   a number of shaped pieces (1) each having a bifurcated fork member at one end and an elongated member at the other end, along the longitudinal axis, the bifurcated fork member of each shaped piece configured to receive the elongated member of another shaped piece, both the bifurcated fork member and the elongated member of each shaped piece having an aperture formed within the respective members, and the apertures of the bifurcated fork member and the elongated member formed to be aligned when the bifurcated fork member receives the elongated member;
   the chain formed by serially interconnecting the shaped pieces, one after another, such that the bifurcated fork member of each shaped piece receives the elongated member of another shaped piece, each two adjacent shaped pieces held together by one of the number of joint pins arranged within the aligned apertures and secured at each bifurcation of the bifurcated fork member, each joint pin having a longitudinal axis through the aligned apertures that is substantially perpendicular to the longitudinal axis of the shaped piece, every joint pin arranged to have parallel longitudinal axes, and the conical shape of each joint pin tapering along the longitudinal axis of the joint pin so as to minimize bending of the chain around an axis other than the parallel longitudinal axes of the joint pins and, thereby, reduce the operational wear to the chain; and
   a driving means having at least one chain wheel (7) for driving the chain.

4. A chain according to claim 3, further comprising:
   a supporting surface (1b) of each shaped piece (1) having notches (2) that are arranged essentially crosswise, in respect to the moving direction (s) of the chain, and to cooperate with counterpart and corresponding surfaces (9) of the wheel arrangement, when the chain is conveyed by the wheel arrangement, wherein
   the conical shape of each joint pin is formed in a linear, convex, or concave way so as to expand the contact area between inner surfaces of the aligned apertures and the respective joint pin that results from the mutual angular alteration of the center lines (k) of the successive shaped pieces of the chain.

5. A chain according to claim 3, wherein:
   the conical shape of each joint pin tapers in the same direction along the parallel longitudinal axes of the number of joint pins.

6. A chain comprising:
   a number of conically shaped joint pins (x);
   a number of shaped pieces (1) each having a bifurcated fork member at one end and an elongated member at the other end, along the longitudinal axis, the bifurcated fork member of each shaped piece configured to receive the elongated member of another shaped piece, both the bifurcated fork member and the elongated member of each shaped piece having an aperture formed within the respective members, and the apertures of the bifurcated fork member and the elongated member formed to be aligned when the bifurcated fork member receives the elongated member;
   the chain formed by serially interconnecting the shaped pieces, one after another, such that the bifurcated fork member of each shaped piece receives the elongated member of another shaped piece, each two adjacent shaped pieces held together by one of the number of joint pins arranged within the aligned apertures and secured at each bifurcation of the bifurcated fork member, each joint pin having a longitudinal axis through the aligned apertures that is substantially perpendicular to the longitudinal axis of the shaped piece, every joint pin arranged to have parallel longitudinal axes, and the conical shape of each joint pin tapering along the longitudinal axis of the joint pin so as to minimize bending of the chain around axis other than the parallel longitudinal axes of the joint pins and, thereby, reduce the operational wear to the chain;

a driving means having at least one chain wheel (7) for driving the chain; and a locking means (10) arranged in connection with the narrower end of each joint pin to secure the joint pin to one bifurcation of the bifurcated fork member.

7. A chain according to claim 6, further comprising:

a supporting surface (1*b*) of each shaped piece (1) having notches (2) that are arranged essentially crosswise, in respect to the moving direction (s) of the chain, and to cooperate with counterpart and corresponding surfaces (9) of the wheel arrangement, when the chain is conveyed by the wheel arrangement, wherein the conical shape of each joint pin is formed in a linear, convex, or concave way so as to expand the contact area between inner surfaces of the aligned apertures and the respective joint pin that results from the mutual angular alteration of the center lines (k) of the successive shaped pieces of the chain.

8. A chain according to claim 6, wherein:

the conical shape of each joint pin tapers in the same direction along the parallel longitudinal axes of the number of joint pins.

* * * * *